Feb. 11, 1958 J. H. BOOTH 2,823,055
BALL JOINT WHEEL SUSPENSION SOCKET ASSEMBLIES
Filed July 6, 1954 4 Sheets-Sheet 1
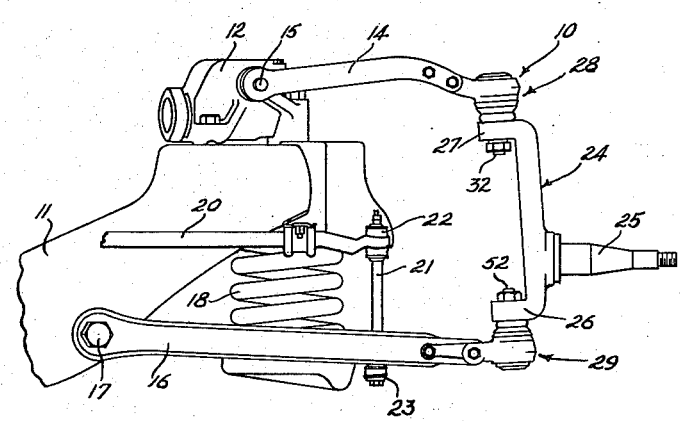
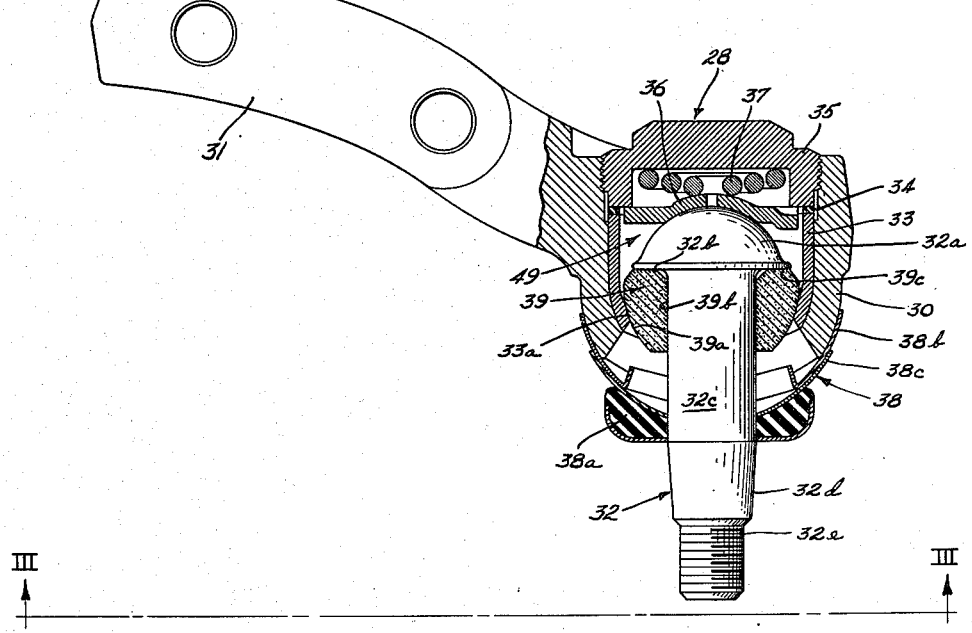
Inventor
JAMES H. BOOTH

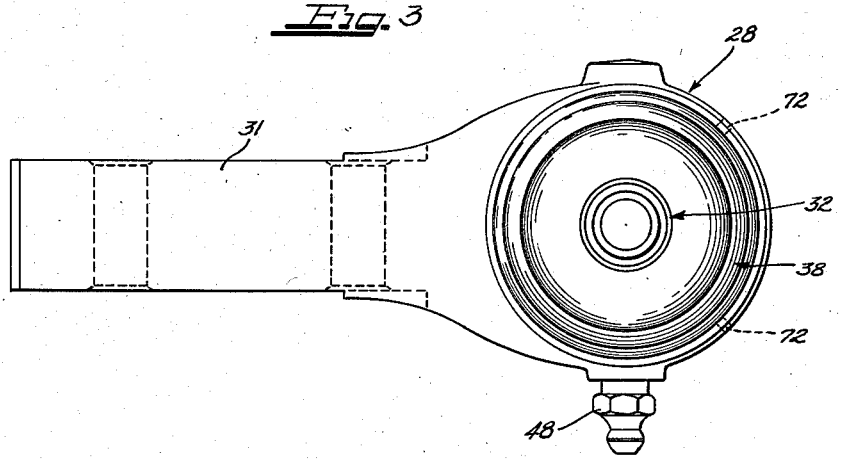
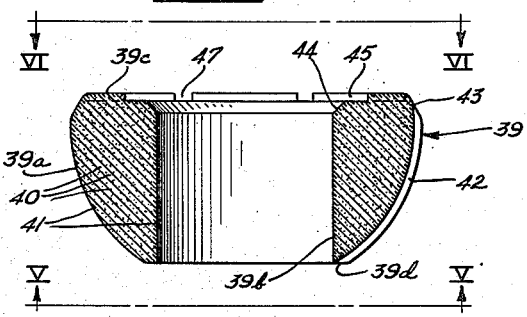
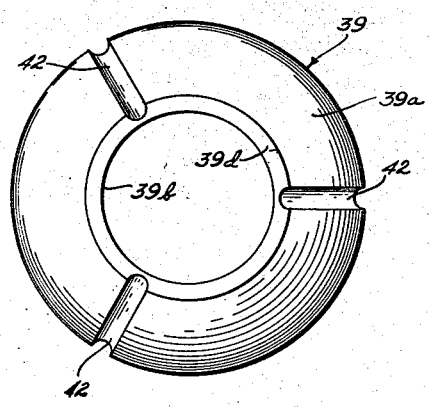
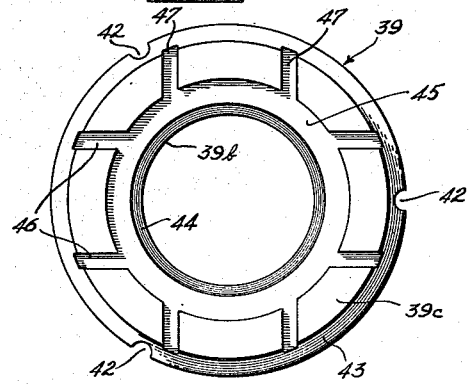
Inventor
JAMES H. BOOTH

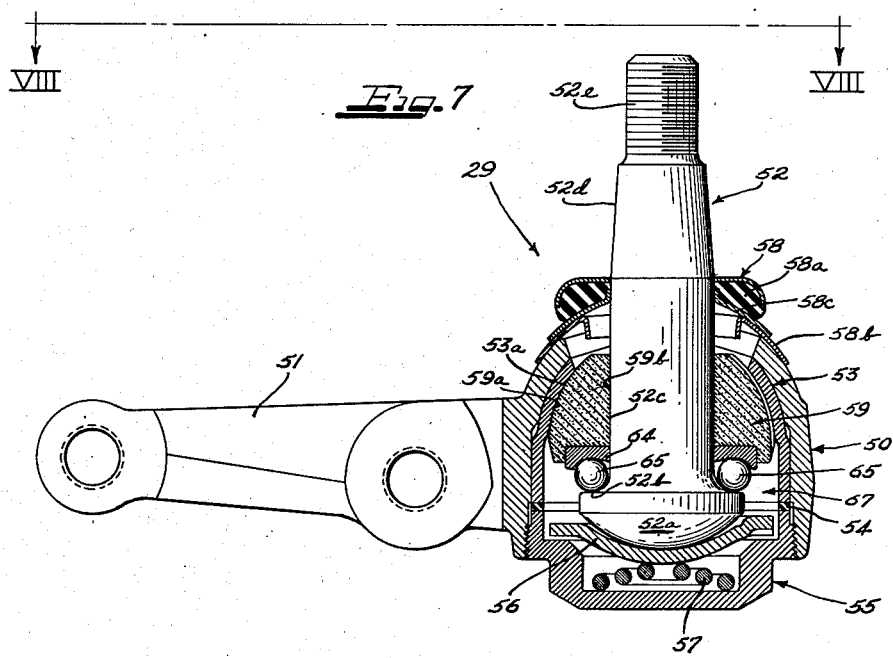
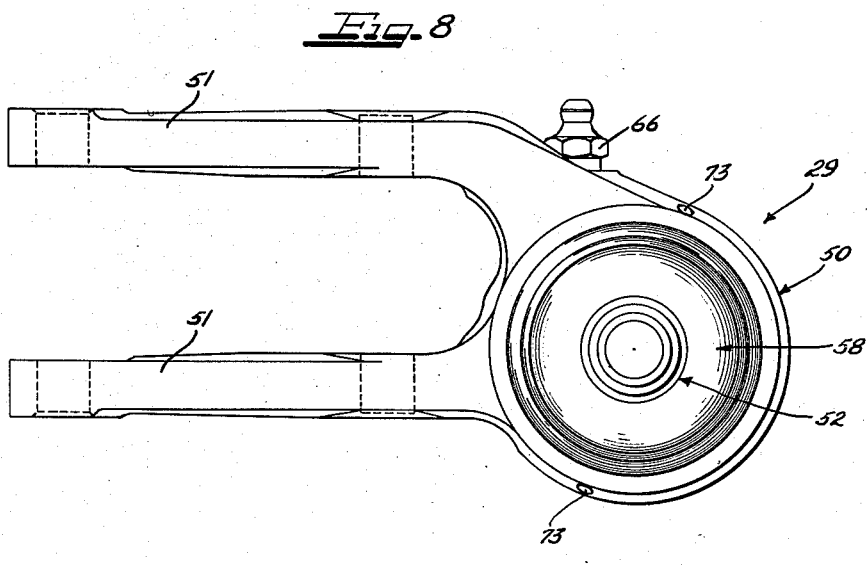

Feb. 11, 1958  J. H. BOOTH  2,823,055
BALL JOINT WHEEL SUSPENSION SOCKET ASSEMBLIES
Filed July 6, 1954  4 Sheets-Sheet 4
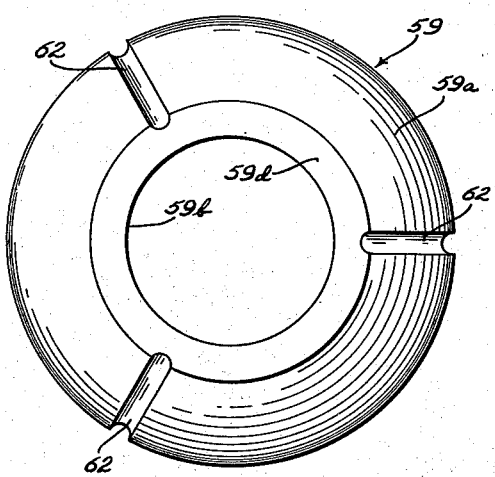
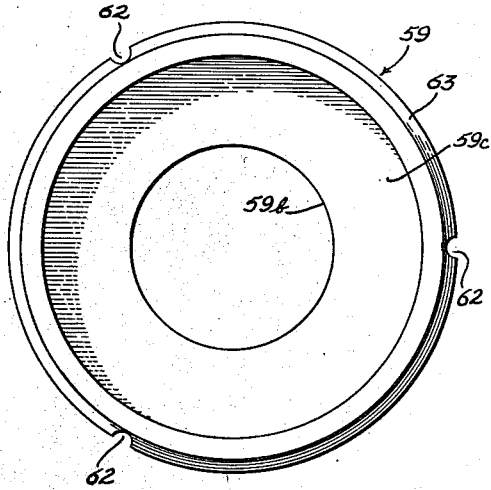
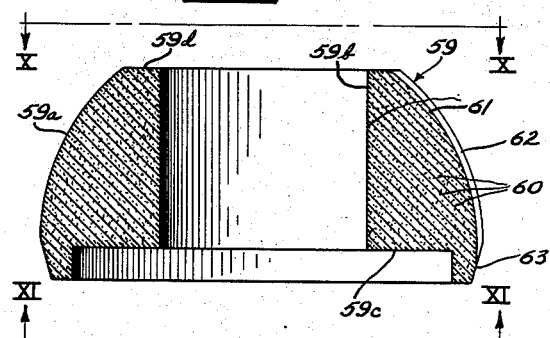
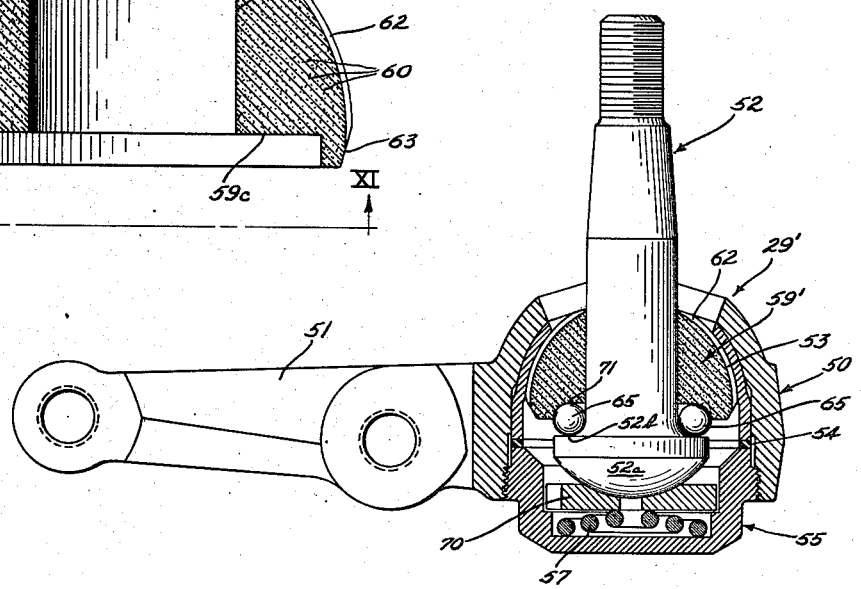
Inventor
JAMES H. BOOTH United States Patent Office 2,823,055
Patented Feb. 11, 1958

2,823,055

BALL JOINT WHEEL SUSPENSION SOCKET ASSEMBLIES

James H. Booth, Corunna, Mich., assignor to Thompson Products, Inc., Cleveland, Ohio, a corporation of Ohio Application July 6, 1954, Serial No. 441,600

4 Claims. (Cl. 287—90)

This invention relates to socket assemblies for ball joint wheel suspensions which are equipped with lubricant-impregnated porous metal bearings to better withstand loads and wear over a long period of use with infrequent greasing or other lubrication. Specifically, this invention deals with socket assemblies of the ball and socket type wherein a ball member receives a stud in rotatable relation therethrough and tilts on a housing bearing wall and is composed of a porous sintered iron composition capable of retaining lubricant in the pores thereof to lubricate the bearing surfaces on both the stud and housing.

Ball joint wheel suspensions of the type disclosed in my United States Letters Patent No. 2,521,335, which include an anti-friction load-carrying joint and a shimmy-dampening controlled friction shock absorber or upper joint, have heretofore utilized forged metal ball members. Such ball members are non-porous and lubrication of the joints has been effective only by utilization of expensive spiral grooves to distribute lubricant over the housing bearing wall. These spiral grooves had to be milled into the forged ball members by a separate operation involving special machinery.

The present invention now provides ball members for the socket assemblies of ball joint wheel suspensions wherein both the anti-friction load-carrying joint and the shimmy-dampening shock absorber joint will operate efficiently over longer periods of time between lubrication and will withstand wear better than the heretofore used forged metal ball members.

In accordance with this invention, the ball members are composed of porous sintered powdered metal which will supply lubricant from the pores thereof. Straight radial grooves, which are easily molded in the ball members, have been found ample to distribute lubricant to the housing bearing wall since these grooves will cooperate with the pores of the ball members to feed the lubricant over the entire bearing wall of the housing.

The ball members of this invention are preferably prepared by compacting iron powder reduced from mill scale at pressure from about 15 to 60 tons per square inch. The compacts are then sintered in a non-oxidizing atmosphere and after sintering, they are cold-coined at pressures ranging from 15 to 60 tons per square inch. During this cold-coining operation, the radial oil grooves and other finishing details, are formed in the ball members. After cold-coining, the members are subjected to a carbo-nitriding treatment which produces a file hard surface thereon. This hard surface remains somewhat porous and while it is quite ample to resist wear under severe operating conditions, it is also somewhat cushioned by the underlying unhardened sintered main body of the bearing whereby cracking and chipping is minimized.

If desired, the sintered compacts can be infiltrated with infiltrant metals, such as copper, prior to the cold-coining operation. The copper-infiltrated compacts are somewhat stronger than the plain sintered compacts but are less porous. Infiltration is, therefore, desirable only where extreme load conditions are to be encountered as for example, in truck installations, and the like.

It is then an object of this invention to provide socket assemblies for ball joint wheel suspensions wherein the main ball or bearing members are composed of sintered powdered metal.

A further object of this invention is to provide a ball joint wheel suspension for the front wheels of automotive vehicles wherein porous sintered iron ball members carry the loads and accommodate tilting and rotating movements.

A still further object of the invention is to provide socket assemblies for ball joint wheel suspensions having bearing members composed of sintered iron impregnated with lubricants and effective to cooperate with easily molded radial lubricant-distributing grooves for insuring adequate lubrication of the socket bearing assemblies.

A specific object of this invention is to provide ball joint wheel suspensions with socket assemblies having cold-coined sintered iron ball members with case-hardened bearing surfaces on softer cushioning main body portions which are effective to resist wear while absorbing shock loads and distributing lubricant from the pores thereof to all bearing surfaces of the assembly.

Other and further objects of this invention will be apparent to those skilled in the art from the following detailed description of the annexed sheets of drawings which, by way of preferred examples only, illustrate several embodiments of the invention.

On the drawings:

Figure 1 is a fragmentary front elevational view of a ball joint wheel suspension equipped with socket assemblies of this invention.

Figure 2 is a vertical cross-sectional view, with parts in side elevation, of the upper ball joint of the wheel suspension.

Figure 3 is a bottom plan view of the joint of Figure 2 taken along the line III—III of Figure 2.

Figure 4 is an enlarged cross-sectional view of the ball member or bearing member of the joint of Figures 1 and 2.

Figure 5 is a plan view taken along the line V—V of Figure 4.

Figure 6 is a plan view taken along the line VI—VI of Figure 4.

Figure 7 is a vertical cross-sectional view, with parts in side elevation, of the lower joint or socket assembly of the wheel suspension of Figure 1.

Figure 8 is a plan view of the joint assembly of Figure 7 taken along the line VIII—VIII of Figure 7.

Figure 9 is an enlarged vertical cross-sectional view of the ball member or bearing member of the joint of Figures 7 and 8.

Figure 10 is a plan view along the line X—X of Figure 9.

Figure 11 is a plan view along the line XI—XI of Figure 9.

Figure 12 is a view similar to Figure 7 but illustrating a modified type of joint assembly.

As shown on the drawings:

The ball joint wheel suspension 10 of Figure 1 is illustrated as mounted on a cross-frame member 11 of an automotive vehicle. A shock absorber 12 on the upper surface of the frame member 11 has an upper control arm 14 secured to the shock absorber shaft 15 for pivotal swinging movement with the shaft. A lower control arm or load-carrying arm 16 is pivotally mounted on the frame member 11 at a point below the shock absorber 12 by means of studs or bolts such as 17. A coil support spring 18 is disposed between the frame member 11 and the load arm 16 to resiliently transfer the weight of the vehicle body from the frame member to the load-carrying arm. A torsion rod 20 has its end portion connected to the lower control arm 16 by means of a link 21 and rubber padded connection members 22 and 23.

A steering knuckle 24 having an integral wheel spindle 25 projecting outwardly therefrom, has an inturned lower boss 26 and inturned upper boss 27. The upper joint 28 of this invention connects the upper boss 27 with the upper control arm 14. The lower ball joint 29 of this invention connects the lower control arm 16 with the lower boss 26.

As best shown in Figures 2 and 3, the upper joint or socket assembly 28, has a cup-shaped housing 30 with an integral laterally extending stem 31 at the upper end thereof and an aperture through the bottom thereof. The stem projects between the forked ends of the control arm 14 and has apertures therethrough for mounting bolts which attach the socket to the arm.

A stud 32 depends through an opening in the bottom of the housing 30 and is attached to the upper boss 27 of the spindle 24.

The cup-shaped housing 30 has a stamped metal liner 33 therein with a fragmental spherical apertured end 33a bottomed in the cup by means of a spacer shim 34 resting on the top of the liner in the housing and a screwplug 35 threaded into the top of the housing against the shim. This screwplug 35 closes the open top of the housing. The apertures in the bottom of the housing 30 and in the bottom of the liner 33, are in registration.

The stud 32 has a head 32a with a rounded dome engaged by a washer or spring seat 36. The spring seat 36 in turn, is urged against the head by a coil spring 37 maintained under compression between the seat and the plug 35. An annular shoulder or face 32b is provided under the head 32a and extends radially inward from the periphery of the head to a cylindrical shank portion 32c. This shank portion is preferably connected to the shoulder 32b through a rounded fillet as shown. The shank portion extends freely through the apertures in the liner and the housing to a tapered portion 32d which converges to a threaded end portion 32e. The tapered portion 32d is wedge-fitted in the upper boss 27 of the wheel spindle 24 and a nut on the threaded end portion 32e draws the tapered portion tightly into the boss.

The open bottom end of the housing is closed by a seal cap 38 including a rubber-lined cup 38a hugging the cylindrical portion 32c of the stud, a dished metal washer 38b seated on the end of the housing, and an intermediate dished washer 38c riding on the washer 38b and underlying the rubber-lined cup 38a.

In accordance with this invention, the stud 32 is rotatably and tiltably supported in the housing 30 on a ball or bearing member 39. As best illustrated in Figures 4 to 6, this ball or bearing member 39 is composed of sintered-together powdered iron particles 40 having a covering case-hardened skin 41 on all exterior surfaces thereof. Both the main body and the skin have pores between the metal particles thereof for accommodating lubricant.

The bearing member is hemispherical with a fragmental spherical outer bearing wall 39a, a cylindrical bore 39b extending axially therethrough, and a grooved flat end face 39c on the top end thereof together with a narrow rim 39d surrounding the bottom mouth of the bore. Three straight radial grooves 42 spaced 120° apart connect the rim 39d with the flat top end 39c. These grooves are preferably about .03 inch deep and cooperate with the pores to distribute lubricant to the bearing wall 33a of the liner 33.

The top end 39c of the ball member 39 has a rounded chamfer or bevel 43 around the outer periphery thereof and a frusto-conical taper 44 around the inner periphery thereof. An annular groove 45 surrounds the taper 44 and two pairs of channels or grooves 46 and 47 are cut across the end face in right angular relation to connect the groove 45 with the bevel 43.

As shown in Figure 2, the shoulder or end face 32b of the stud head 32a rides on the top end face or end wall 39c of the ball member or bearing member 39 while the cylindrical portion 32c of the stud shank rides on the cylindrical bearing wall 39b of the ball member. The fragmental spherical bearing wall 39a in turn, rides on the fragmental spherical inturned portion 33a of the liner 33.

Lubricant is supplied to the interior of the joint assembly 28 through a fitting 48 threaded into a suitable boss on the cup-shaped housing 30 and introducing the lubricant into the space or chamber 49 above the bearing member 39. The lubricant in this chamber 49 is thereupon distributed through the channels and grooves 42, 46 and 47 to all bearing surfaces of the assembly. In addition, the pores between the powdered metal particles 40 will be impregnated with lubricant and will release this lubricant through the pores of the hardened skin 41 when needed. If desired, the bearing or ball member 39 can be initially impregnated with lubricant before incorporation in the joint assembly.

The load-carrying ball joint 29 best shown in Figures 7 and 8, has an inverted open-topped cup-shaped forged metal housing 50 with a pair of spaced parallel arms 51 extending therefrom and straddling the ends of the lower control arm 16. Apertured bolt pads are provided through the arms to receive mounting bolts as shown in Figure 1. A stud 52 projects freely through the open top of the housing 50 and through the lower boss 26 of the spindle 24. A liner 53 in the housing 50 has an inturned fragmental spherical apertured end portion 53a bottomed against the inturned apertured top of the housing by a shim 54 which is clamped by an end cap 55 threaded into the open bottom of the housing.

The stud 52 has an enlarged round bottom head 52a seated on a spring seat or cap 56 which is urged against the head by a coil spring 57 held under compression between the closure cap 55 and the retainer 56. The head 52a terminates in a flat radially extending shoulder 52b which extends inwardly to a cylindrical shank 52c. The shank 52c projects through the open top of the housing 50 and has a tapered portion 52d converging to a threaded end portion 52e. This tapered portion 52d is adapted to be locked in the boss 26 of the spindle 24.

The open top end of the housing 50 is closed by a seal or dust cap 58 which, like the cap 38 of the upper joint 28, has a rubber-lined metal cup 58 hugging the cylindrical shank 52c of the stud, a dished washer 58b seated on the top of the housing and an intermediate washer 58c slidable on the washer 58b and underlying the rubber liner 58a in the cap 58.

In accordance with this invention, a sintered porous powdered iron ball or bearing member 59 is interposed in the housing between the stud 52 and the liner 53. The bearing 59 has a fragmental spherical outer wall 59a tiltable on the converging wall 53a of the liner and has a cylindrical bore 59b axially therethrough rotatably receiving the cylindrical shank 52c of the stud.

As best shown in Figures 9 to 11, the ball or bearing member 59 has a recessed flat bottom 59c and a flat rim 59d at the top thereof surrounding the bore 59b.

As best shown in Figure 9, the body of the bearing is composed of iron particles 60 and the exterior surfaces of the body are case-hardened at 61 to a file hardness. The hard surface 61 is somewhat cushioned on the softer unhardened main body. The entire body including the surface or skin 61, however, is porous.

Three radial grooves 62, spaced 120° apart, connect the outer portion of the rim 59b with a bevel or chamfer 63 surrounding the recessed bottom 59c.

A solid metal stamped or forged ball race member 64 is seated in the recessed bottom 59c and freely surrounds the shank 52c as shown in Figure 7. A ring of ball bearings 65 is interposed between this race member 64 and the shoulder 52b of the stud head. The ball members 65 provide anti-friction bearing means for rotatably supporting the stud inside of the ball member or bearing member 59. Since the load of the automotive vehicle is supported on these ball members 65 while the stud 52 is held under tension, rotation of the stud to accommodate steering movements is facilitated on the anti-friction bearings. At the same time, the entire assembly of stud and ball member 59 is free to tilt on the liner 53 since the stud will carry the ball member therewith during all rocking movements of the stud in the housing. The spring 57 will maintain the seat 56 against the stud head 52a and, at the same time, will urge the stud head into good bearing engagement with the ring of balls. The ring of balls, in turn, will urge the ball member 59 into good bearing engagement with the liner 53.

Lubricant is fed from a grease fitting 66 (Figure 8), carried by the housing 50 to supply lubricant to the chamber 67 under the ball member 59. Lubricant from this chamber will be distributed through the radial grooves 62 to lubricate the bearing wall 53a. At the same time, the lubricant will flow around the ball members 65 and will impregnate the porous bearing member 59. Lubricant from the pores of the porous bearing member will be available to supply any dry spots on the bearing surfaces. The porous ball member, therefore, makes possible the efficient operation of the joint over longer periods of time between greasings.

In the modified socket assembly 29' of Figure 12, parts identical with parts described in Figure 7, have been marked with the same reference numerals. In the modified arrangement 29', the closure plug or cap 55 receives a flat washer-like spring retainer 70 for supporting the head 52 of the stud, and the ball or bearing member 59' has a round bottom groove 71 in the bottom face thereof directly receiving the ring of balls 65. In other words, the race 64 is eliminated and the ring of balls ride directly on the sintered powdered iron ball member 59'.

If desired, in order to insure against possible rotation of the liner members 33 or 53 in their respective housings 30 and 50, set screws can be threaded into the side walls of the housing to engage the liners and lock them against possible rotation. Thus, as shown in Figure 3, a pair of set screws 72, are threaded through the side wall of the housing to bite into the skirt of the liner 33. Also, as shown in Figure 8, a pair of set screws 73 can be threaded or wedged into the housing 50 to lock into the liner 53.

The ball or bearing members 39, 59 and 59', are preferably molded from iron powder which is reduced from mill scale. A preferred chemical composition for this powder is as follows:

*Chemical analysis*

| C | .08 to .15 max. |
|---|---|
| Mn | .20 to .50 max. |
| P | .04 max. |
| S | .04 max. |
| Si | .30 max. |
| Fe | Bal. |

The powder preferably has the following particle size:

*Screen analysis*

| Sieve No.: | Percent retained |
|---|---|
| +100 mesh | 0.5 |
| −100 +150 mesh | 15.9 |
| −150 +200 mesh | 17.0 |
| −200 +325 mesh | 27.3 |
| −325 mesh | 39.0 |

The iron powder is compacted in molding dies at pressures within the range between about 15 and 60 tons per square inch. The radially extending grooves, the finished end face grooves and the like details, are preferably not formed during the compacting step.

The compacts are sintered in a cracked ammonia, hydrogen, or other reducing gas atmosphere, at temperatures under the melting point of the metal but sufficiently high to coalesce the metal particles and fuse the same together into a porous self-sustaining mass. Preferred sintering temperatures extend from 1400° to 2100° F. and the time of sintering will vary in accordance with the size of the bearing.

After sintering, the sintered compacts are cold-coined in coining dies equipped with surfaces which will impart the desired finished contours to the members including the lubricant grooves, the end face grooves, the chamfers and the like. The cold-coining also sizes the units.

The bearing units or ball members will have a porosity of about 12% to 15% but the density and porosity can be controlled to any desired degree by the compacting and coining pressures and by the sintering treatment.

After the cold-coining, the bearing or ball members are subjected to a carbo-nitriding process which case-hardens their surfaces to a file hardness approximately .003 inch deep.

If desired, the molded compacts can be infiltrated with copper by placing copper slugs thereon during sintering or in a separate infiltration heat treatment step. Alternately, copper powder, up to 5% by weight, can be added to the molding powder. Infiltration produces a denser and somewhat stronger ball member but the added strength is normally not necessary and the less dense or porous structure of the plain sintered ball member is preferred to enhance lubricant retention and further insure against development of unlubricated or dry areas.

The powdered porous metal ball members are especially well adapted to cooperate with stamped or forged solid metal bearing members to reduce friction, scuffing and wear. The hard wear-resisting bearing walls of the ball members are also cushioned on the softer underlying main body so that cracking or splitting of the ball member is prevented.

From the above descriptions it will, therefore, be understood that this invention provides improved socket assemblies for ball joint wheel suspensions and the like, wherein porous metal ball members or bearings are adapted to withstand load and wear over prolonged periods of operation without lubrication.

It will be understood that variations and modifications may be effected without departing from the scope of the novel concepts of this invention.

I claim as my invention:

1. In a wheel suspension, a ball and socket joint which comprises a housing assembly having an internal fragmental spherical bearing wall converging to an aperture, a porous sintered powdered ferrous metal ball member tiltably mounted on said bearing wall, said ball member having an end face in said housing, a stud having a cylindrical shank rotatably mounted in the ball member and projecting through the aperture of the housing, said stud having a head overlying the end face of the ball member, means urging the stud head toward said end face of the ball member and thereby urging the ball member toward the fragmental spherical bearing wall of the housing assembly, said ball member having an integral case-hardened porous outer bearing surface cushioned on a softer main porous body of the ball member and in bearing engagement with said bearing wall of the housing and said stud head, and lubricant in the pores of the ball member adapted to be released therefrom through the porous outer case-hardened surface in operation of the joint for eliminating dry spots on the bearing surfaces of the joint.

2. In a wheel suspension or the like, a load-carrying socket assembly which comprises a housing having an internal fragmental spherical bearing wall converging to an aperture, a stud having a shank projecting freely through said aperture and an enlarged head disposed in said housing, a porous sintered powdered ferrous metal ball member having a bore receiving said shank therethrough in rotatable relation, an end wall receiving said stud head in thrusting relation and a fragmental spherical bearing wall tiltable on the bearing wall of said housing, said ball member having an integral porous case-hardened bearing surface defining said bore, said end wall and said spherical bearing wall, said hardened surface being cushioned on a softer porous main body portion of the ball member, a spring in the housing acting on said stud head to thrust the head against the ball member and the ball member against the bearing wall of the housing, and said ball member having grooves in the spherical bearing wall and the end wall thereof to cooperate with the parts for distributing lubricant to the bearing surfaces of the joint assembly.

3. A ball member for a wheel suspension socket assembly which comprises a porous fragmental spherical body having an axial cylindrical aperture therethrough together with a flat end wall, said body being composed of sintered together powdered metal particles with voids therebetween, said body having a porous integral case-hardened skin on all exterior surfaces thereof defining wear resisting bearing surfaces on said body without closing the pores of the body, said hardened skin being cushioned on a softer underlying main body of the ball member, and lubricant-conveying grooves in said body and skin coacting with the pores to distribute lubricant.

4. A ball member for a socket assembly which comprises a porous sintered ferrous metal hemispherical body having a flat end wall at the great circle thereof and a cylindrical bore bisecting said end wall and extending axially through the body, said body being composed of sintered fused-together particles of metal with pores therebetween and having the external surfaces thereof case-hardened to file hardness without closing said pores, said hardened exterior surfaces providing bearing walls and being cushioned on softer underlying metal particles, and grooves in the hemispherical wall of the body cooperating with said pores to distribute lubricant.

References Cited in the file of this patent

UNITED STATES PATENTS

| | | |
|---|---|---|
| 2,455,343 | Slack et al. | Nov. 30, 1948 |
| 2,521,335 | Booth | Sept. 5, 1950 |
| 2,569,823 | Moskovitz | Oct. 2, 1951 |
| 2,631,865 | Hoffman | Mar. 17, 1953 |
| 2,645,510 | Booth | July 14, 1953 |
| 2,665,960 | Causley | Jan. 12, 1954 |
| 2,701,151 | Booth | Feb. 1, 1955 |

FOREIGN PATENTS

| | | |
|---|---|---|
| 473,254 | Great Britain | Oct. 8, 1937 |